March 28, 1939.  T. A. BANNING, JR  2,152,017
BRAKING SYSTEM
Filed Nov. 11, 1936  3 Sheets-Sheet 2
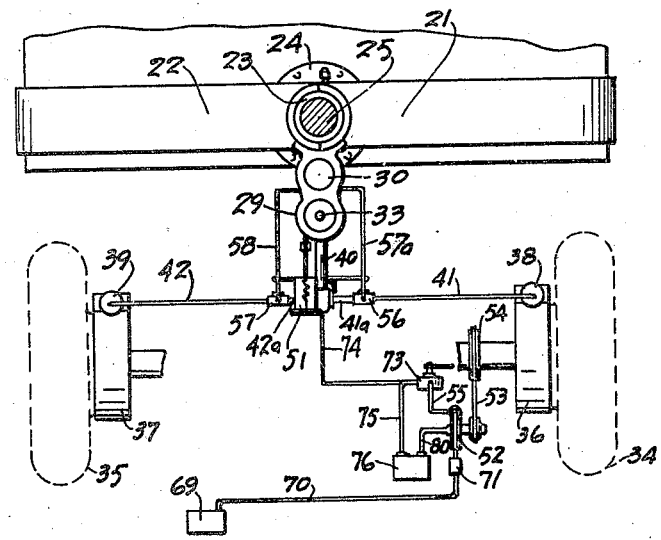
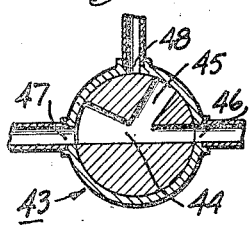
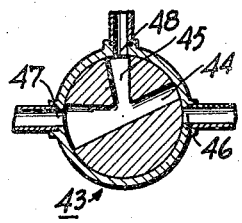
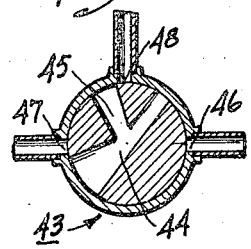
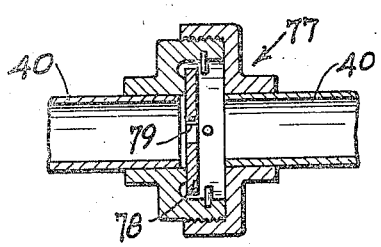
INVENTOR.
Thomas A. Banning, Jr.
BY Jerome R. Cox.
ATTORNEY.

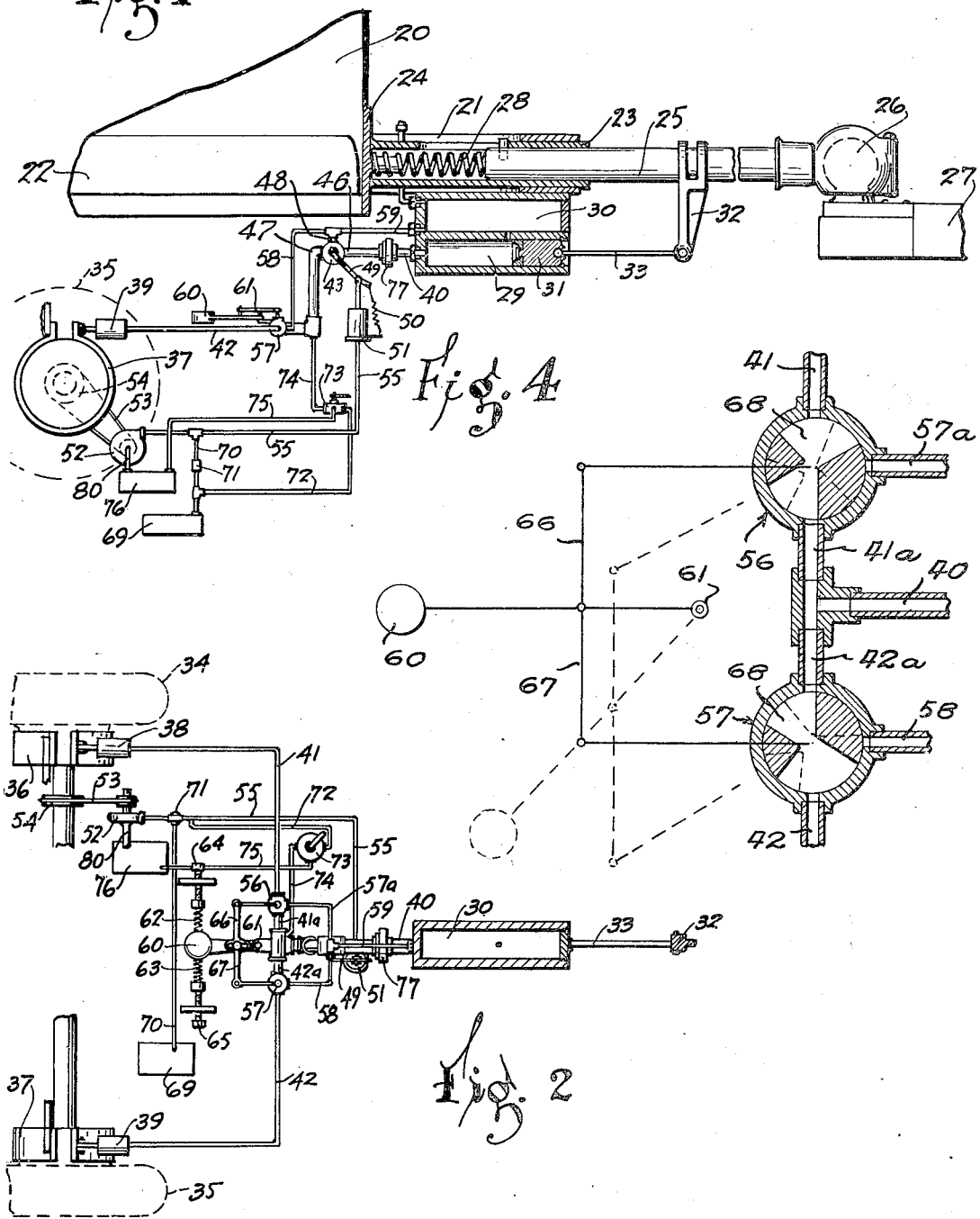

March 28, 1939.　　　T. A. BANNING, JR　　　2,152,017
BRAKING SYSTEM
Filed Nov. 11, 1936　　　3 Sheets-Sheet 3

Inventor:
Thomas A Banning, Jr.
by Jerome O Cox
Atty.

Patented Mar. 28, 1939

2,152,017

UNITED STATES PATENT OFFICE 2,152,017

BRAKING SYSTEM

Thomas A. Banning, Jr., Chicago, Ill., assignor to Bendix Products Corporation, South Bend, Ind., a corporation of Indiana Application November 11, 1936, Serial No. 110,252

15 Claims. (Cl. 188—142)

This invention concerns itself with improvements in braking systems and the like. The features herein disclosed are intended, and have been designed, especially for use in connection with so-called "trailers" which are attached to and drawn along the road by automotive vehicles, but it will presently appear that certain of said features may be used in connection with other vehicles; and for this and other reasons I do not intend to limit myself in this respect, except as I may do so in the claims to follow. I may also mention in this connection that the present features have been especially designed for use in connection with so-called "house-trailers" as distinguished from commercial trailers, but do not intend to limit myself in this respect other than as limited by the claims.

The main object of the invention is to provide an arrangement of braking system which shall be completely self-contained within the trailer itself, so that it is unnecessary to establish any special connections between the braking system and devices of the automobile or tractor unit to which the trailer is connected, and the trailer braking system. In other words, this feature of the invention relates to the provision of a trailer braking system which will respond automatically when the automobile or tractor unit is "braked", and without special connections between the two units for this purpose. The desirability of such an arrangement will be better understood, when it is remembered that the trailer unit is generally built and sold entirely distinct from the automobile unit, and further, when it is remembered that a given trailer unit may be attached to any one of many types and sizes of automobile units, and that interchangeability is very greatly to be desired. That is, it is desirable to be able to buy the trailer unit independently of the automobile unit, and make connection between them thereafter; and in making such connection to be able to secure proper operation of the trailer braking system without having to establish special connections to the braking system of the automobile. By this means it will be possible to effect great saving in the cost of initial construction of both units, and also to eliminate the special work incident to making connections to the automobile braking system.

In connection with the foregoing it is a further object to provide for quick response of the trailer braking system to the varying requirements imposed by varying applications of the automobile braking system, both as to amount or degree of the braking force, and the conditions of travel under which same is created. In this connection it is an object to increase or decrease the braking effect of the trailer brakes synchronously with corresponding changes of the braking effort of the automobile itself. Generally speaking, the application of the trailer brakes is effected by an "over-riding" of the trailer towards the automobile. In this connection, as the braking effect of the automobile is increased with increase of "over-riding", the braking effect of the trailer brakes is also increased, and vice versa.

A further object of the invention is to make provision for locking out the trailer brake system when the automobile is reversed in direction of travel, so that the trailer brakes will not interfere with such reversal of travel. In this connection it is a further object to effect such lock-out operation automatically, and without the need of any special connection between the automobile and the trailer braking systems, or other devices. Also, to make provision for resumption of the normal braking action of the trailer unit system when forward movement is again resumed. Specifically, this result is accomplished, in the arrangement herein disclosed, by a speed governor arrangement whereby the trailer braking system is at times ineffective. Thus normal backward force exerted on the traction or draw bar connection from the automobile to the trailer will not actuate the trailer brakes: but the trailer braking system is rendered operative when the trailer reaches a forward speed of say three or four miles per hour, or when the trailer is being driven rearwardly at a somewhat higher speed. Inasmuch as reversing movements of an automobile and trailer combination are generally made only for "parking" or similar purposes, and always under great caution, low speeds are seldom, if ever, exceeded during reversing of such a combination.

Specifically, the arrangement herein disclosed is one in which the controlling of the operative or inoperative condition of the trailer brake mechanism is effected by pressure generated by a small centrifugal pump driven at a speed proportional to the speed of trailer travel. Such pump is effected to build up pressure in either direction of rotation and, therefore, for either forward or reverse travel of the trailer; but due to the form of the vanes of the pump impeller, it is less efficient for building up such pressure when rotated in a reverse direction than when driven forwardly. As a consequence this arrangement is such that the necessary speed of travel of the trailer in a forward direction to build up sufficient pressure to actuate the lock-out device is less that the necessary speed of travel in a reverse direction to actuate the lock-out device. Therefore, one feature of the invention relates to an arrangement in which the trailer may be moved in a backward direction with its braking system rendered ineffective faster than the speed in a forward direction which would render its braking system ineffective, thus making it possible to perform backward movements at speeds greater than would otherwise be possible and without interference due to any actuation of the trailer brakes during such backward movements.

A further feature of the invention relates to the provision of means for equalizing or adjusting the braking actions exerted on the two trailer wheels automatically with any tendency of the trailer to sway sidewise during travel on the road with the brakes applied. Since the forward pressure of the trailer against the automobile is effected with a pivoting effect along the center line or axis of the combination, it follows that any effect which swings the trailer out of line with respect to the automobile, during the braking operation, tends to cause side sway with an accentuated effect; and may become a source of great danger on the road. The present feature of this invention relates to an arrangement whereby any such tendency of the trailer to swing sidewise causes a momentary or temporary adjustment of the braking actions on the two trailer wheels, in such a manner as to tend to draw the trailer automatically back into alignment with the automobile. This result is effected, in the present disclosure, by means of a momentum or pendulum device, operative under the sidewise forces thus to be compensated for.

It will sometimes be desirable to make provision for locking the trailer brakes in the "on" condition, even when the trailer is standing idle, as for example, when parked, or when standing on a hill. I have therefore also made provision for such locking of the trailer brakes under such conditions, and irrespective of the condition of the brakes of the automobile or tractor unit.

All or combinations of the results heretofore enumerated may be secured in systems embodying the features of the present invention, and therefore in some cases certain of the devices hereinafter to be described may be eliminated without detriment to the proper and efficient functioning of the remaining devices.

Generally speaking it may be further stated that it is an object of the invention to so arrange the trailer braking system that the trailer with its braking system is a completely self-contained unit, ready for functioning and travel, and may be connected to the automobile or tractor unit in simple manner, and without having to give consideration to the braking systems of either unit; and still, when the trailer has been so connected to the automobile unit, and the combination is taken out on the road for travel, the trailer braking system will function perfectly, and in full accord with the braking and retarding actions of the automobile unit.

Specifically, I have also illustrated, and shall describe the features of the present invention as embodied within a hydraulic braking arrangement, but it will presently appear that certain of said features are also susceptible of use in connection with mechanical braking systems.

Other objects and uses of the invention will appear from a detailed description of the same, which consists in the features of construction and combinations of parts hereinafter described and claimed.

In the drawings:

Figure 1 shows a fragmentary side elevation of the front portion of a trailer unit with the braking system shown thereon, more or less in diagrammatic form, the draw bar connection to the automobile or tractor unit being shown broken away;

Figure 2 shows a plan view corresponding to Figure 1;

Figure 3 shows a front end view corresponding to Figures 1 and 2;

Figure 4 shows a cross-section through a typical form of equalizer valves, the operating mechanism therefor being shown diagrammatically and one operating position thereof being shown in dotted lines;

Figures 5, 6 and 7 show three consecutive positions, in cross-section, of a typical form of cutout valve;

Figure 8 shows a cross-section through a typical form of valve in the main line between the "master" cylinder and the "brake" cylinders, to reduce or prevent any tendency to "hunt" or "surge", when the automobile or tractor unit is "braked";

Figure 9:
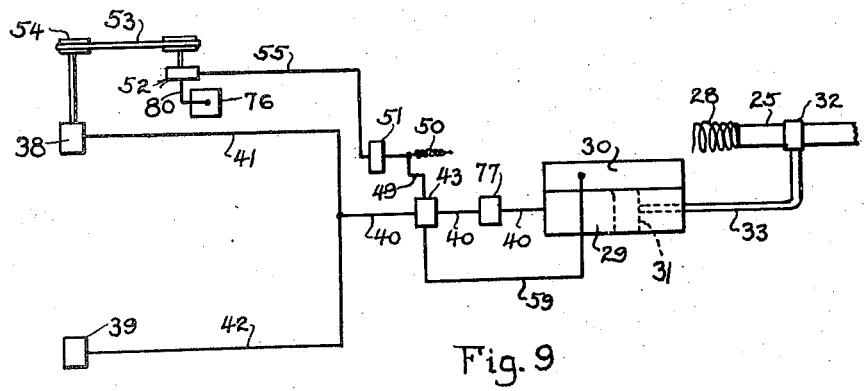
Figure 9 shows diagrammatically a layout of simple form in which the "side-sway" eliminator arrangement and also the "manual" brake lock, have been eliminated.

Referring first to Figures 1, 2 and 3, I have therein shown the front end portion of the trailer by the numeral 20. It is shown as having the lower frame members 21 and 22, of channel cross-section, the front ends of which members are brought together to embrace a tubular member 23, to which the frame members are secured. The rear end of this tubular member is provided with the foot 24 which is secured directly to the front end of the trailer body. There is a draw member 25 telescopically entered into the tubular member 23 so that said draw member may move back and forth to a sufficient extent to properly actuate the braking system of the trailer, as will soon be explained. The front end of this draw member carries the fixture 26 of familiar form which may be connected to the companion draw member 27 which is in turn connected to the automobile or tractor unit. A spring 28 is placed between the inner end of the draw member 25 and the foot 24, and tends to hold and restore the draw member in the forwardly projected condition, but said spring is not heavy enough to prevent the draw member from moving back and forth to effect brake actuations of the braking system of the trailer unit.

A typical form of "master" cylinder unit of a hydraulic braking system is mounted under the forwardly projecting portions of the frame members 21 and 22. This includes the "master" cylinder 29, and the "compensating" chamber 30 above the same, and the master plunger 31 working in the master cylinder. The details of these parts require no explanation here, beyond the statement that when the master plunger is moved to its forward position it permits replenishment of the oil in the master cylinder behind said plunger, and when the master plunger is forced back it delivers oil under proportional pressure to the brake cylinders of the two wheel brakes of the trailer unit. There is a yoke 32 secured to the draw member 25, and a suitable connection 33 connects said yoke with the plunger of the master cylinder. Consequently, as the draw member moves back and forth the master plunger is correspondingly actuated.

The two wheels of the trailer are indicated at 34 and 35. Suitable brake drums are connected to these wheels, and the brake bands 36 and 37 are shown for these brake drums. There are also shown the brake wheel hydraulic cylinders 38 and 39 for these brake bands respectively. The master oil line 40 leads from the master cylinder 29 to a division point where it connects to the individual lines 41 and 42 leading to the two wheel cylinders.

In the master oil line 40 there is placed the cut-out valve 43, shown diagrammatically in Figures 5, 6 and 7. This valve has the through passage 44 in its plunger, together with a lateral connection 45 therefrom; and the casing of this valve has the port 46 leading to the master cylinder, the port 47 leading to the wheel cylinders, and the port 48 leading back to the compensating chamber 30. This valve is provided with the control arm 49 which is connected to the restoring spring 50 (shown as a compression spring in Figure 1). There is a control diaphragm device 51 which when energized by oil under pressure will force the arm 49 upwards against the force of the spring 50, to thereby move the valve to the position shown in Figure 5. In that position oil from the master cylinder will be delivered to the wheel cylinders in normal manner for braking functions. When the pressure within the device 51 falls below a certain predetermined amount, corresponding to a certain speed of travel, the spring 50 will overcome the diaphragm pressure and the valve will be forced towards the closed position of Figure 7, wherein all of the ports are sealed, including the master cylinder. During such closing movement, however, the valve will pass through the position depicted in Figure 6, wherein the wheel cylinders are temporarily connected to the compensating chamber, so as to allow the accumulated pressure within the wheel cylinders to be released, and thereby release the wheel brakes before the sealing position of Figure 7 is finally reached. When the position of Figure 7 is finally reached the master cylinder is sealed, so that the force exerted on the master plunger by the draw member 25, as during backing, is properly resisted.

The diaphragm device 51 is actuated to open the valve to the position of Figure 5 when the speed of the trailer exceeds, for example, three or four miles per hour, or some other relatively low speed. Such speed is so low that the use of the trailer brakes is no longer necessary to ensure complete deceleration of the combined automobile and trailer combination. Whenever the trailer is travelling at a speed greater than such minimum speed the valve 43 is in the condition depicted in Figure 5 wherein a deceleration of the automobile will ensure application of the trailer brakes, and such condition will continue until the speed falls below such minimum speed, whereupon the valve 43 will shift to the position of Figure 7, passing through that of Figure 6; and while passing the position of Figure 6 the accumulated pressure within the brake cylinders will be released, so that when the trailer finally comes to rest the brakes will be in released condition, making it possible to thereafter push the trailer backwards if so desired. When the automobile is subsequently driven forward the device 51 will function as soon as the minimum speed is exceeded, to thereby again move the valve 43 into condition for proper trailer brake functioning under travel.

It is now seen that I have provided an arrangement such that the functioning of the brake of the trailer will not occur during reversal, but these brakes will be left in released condition at such time.

In the arrangement shown in the drawings I have provided a small centrifugal pump 52, driven in convenient manner by one of trailer wheels, as by the belt 53 passing over the pulley 54 on the axle of the wheel 34. This centrifugal pump connects by the line 55 to the diaphragm device 51, so that as the trailer speed rises the pressure delivered to the diaphragm device rises to the actuating point. Any other convenient means might be substituted for operating the valve 51 in the desired manner.

I have already referred to the fact that the centrifugal pump arrangement is one in which the actuating pressure for actuating the diaphragm device 51 and valve 43 will be developed by the centrifugal pump at a lower speed of trailer travel forwardly than the trailer speed necessary to develop such pressure when travelling backwardly. I, therefore, contemplate as being within the scope of my invention, generally, any device which will ensure locking-out the action of the trailer braking system, when the speed is less than a certain predetermined amount, and including such devices which will ensure such lock-out action at a greater speed when reversing the trailer than when the same is travelling forwardly.

There are the valves 56 and 57 located in the branch pipes 41 and 42 respectively leading to the wheel brake cylinders. These valves are of the general form shown in Figure 4. They normally stand in position to permit free flow of oil back and forth to the respective wheel brake cylinders; but when said valves are shifted they will allow drainage of oil from their respective wheel brake cylinders back to the compensating chamber of the master cylinder. For this purpose there are provided the lines 57ᵃ and 58 leading from the return ports of the respective valves to a common line 59 leading to the compensating chamber.

There is a "pendulum" or momentum device 60 pivoted at the point 61 so that it may swing back and forth laterally of the line of travel of the trailer. Springs 62 and 63 act on this pendulum at the two sides thereof, and can be adjusted by the set screws 64 and 65. Normally the arrangement is such that the pendulum stands in the central position shown. This pendulum connects by the links 66 and 67 with the valves 56 and 57 respectively, so that as the pendulum sways back and forth it will actuate the two valves in unison and harmony. The arrangement functions as follows:

Assuming that the trailer is travelling uniformly without side sway, both valves are open, so that upon application of braking pressure both wheel brake cylinders will be equally energized. In case the trailer should sway to the left in Figure 2, for example, the pendulum would tend to remain in its original line of travel, holding back, and thus acting in effect to turn both of the valves 56 and 57 counter-clockwise, as shown by the dotted lines in Figure 4. In so doing the passage 68 of the right hand valve would be moved to close against the master cylinder and place the brake wheel cylinder into connection with the line 58 leading back to the compensating chamber, thereby releasing pressure from such wheel brake cylinder; but in the meantime, the passage 68 of the left hand valve 56 would remain unconnected with the return passage 57ᵃ, and therefore pressure would not be released in the left hand wheel brake cylinder. The result would be that the left hand wheel would continue to be braked, but the braking action on the right hand wheel would be released, either partially or fully; and the left hand wheel would therefore hold back with the greater force, tending to pull the trailer back towards the right, and thereby resist such leftward side sway. A similar action would be created in case of tendency to sway to the right. I have thus provided means for automatically compensating for side sway, and for tending to keep the trailer travelling centrally during braking actions. It will be noted that this compensating action is only produced during braking action, but at such time the tendency to produce side sway is greatest and most dangerous.

In some cases it might be desirable to be able to set the brakes on the trailer manually, and maintain them in such set condition even when the trailer has come to complete rest. This might be desirable, for example when the trailer has been "parked". I have therefore provided the oil pressure chamber 69 to which the delivery side of the pump 52 is connected by the line 70, a check valve 71 being placed in such line so that oil can flow from the pump to the pressure chamber only when the pump pressure exceeds that of the chamber 69, and so that pressure in the chamber 69 will not be lost when the pump speed falls. A line 72 leads from the pressure line 70 to a manual valve 73, which is a three way valve. From this valve 73 a line 74 leads to the main line 40 so that pressure may be applied to such main line by opening the manual valve; and a return line 75 leads from this manual valve to the return reservoir 76. By this arrangement, when the manual valve is turned to the brake-on position pressure will be delivered to the wheel brake cylinders, and when the manual valve is turned to the releasing position the pressure will be released from the wheel brake cylinders; and at another position the line 74 is sealed so that the draw connection can properly function to actuate the trailer braking system.

It will be noted that when the automobile or other tractor unit is travelling normally without braking action, the draw connection 25 is extended by the spring 28. Upon the application of braking force to the automobile brakes, with deceleration of the automobile, the trailer will tend to overrun the automobile, and the draw connection 25 will be forced back. This will cause application of braking pressure to the trailer brakes, and thereupon the compressing force on the draw connection 25 will be reduced, with corresponding reduction of the braking action of the trailer brakes. This will somewhat reduce the holding back of the trailer, so that its tendency to again overrun the automobile will rise; and thus there may be a tendency to build up a "hunting" action between the automobile and the trailer. This action or tendency may be accentuated by any irregularities of the braking action of the automobile due to irregular braking of the driver thereof. In order to reduce the tendency towards such "hunting" I have placed the valve device 77 in the main line 40. This valve device includes the flap valve 78 normally closing in the direction of the delivery of oil to the wheel brake cylinders, and freely opening in the direction of return of oil towards the "master" cylinder; and this flap valve is provided with the smaller opening or port 79 which permits flow of oil to the wheel brake cylinders, but under such restriction as will dampen any tendency towards such "hunting" as just above referred to.

In view of the fact that the centrifugal pump will draw oil into its intake opening, I have connected the same with the return chamber 76 by the line 80. In order to limit the back and forth movements of the draw member or connection, I have provided the pin and slot arrangement between the member 25 and the sleeve or tubular member 23, as shown in Figures 1 and 2.

Figure 10:
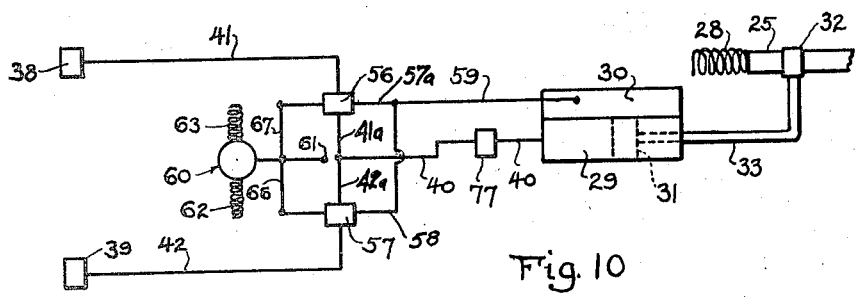
Figure 10 shows diagrammatically a layout of simple form in which the "lock-out" for backing up, and also the "manual" brake lock, have been eliminated.
Figure 11:
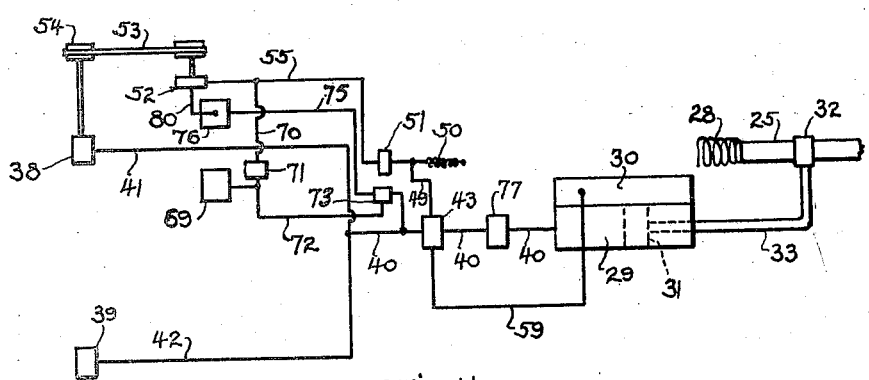
Figure 11 shows diagrammatically a layout of simple form in which the "side-sway" eliminator arrangement has been eliminated.

It will be noted that in Figures 1, 2 and 3 I have shown all of the functions and devices combined together into a complete system, capable of functioning and performing in all of the manners herein set forth. In order to simplify an understanding of the several possible functions and features, and to emphasize that each feature may be used without the other, I have, in Figures 9, 10 and 11, separated these features from each other, so that the operation of each one of them may be better understood individually. These several figures will be readily understood without detailed description, and they have been numbered according to the numbering heretofore recited in connection with Figures 1 to 8 inclusive.

While I have herein shown and described only a single embodiment of the features of my present invention, still I do not intend to limit myself thereto, except as I may do so in the claims.

I claim:

1. The combination with an automobile tractor unit having the usual braking system and controls therefor, of a trailer unit in conjunction therewith, wheel brakes on the trailer unit, a yieldable tractor connection between said tractor unit and said trailer unit yieldable longitudinally of the combination, brake operating mechanism on the trailer unit effective to operate the brakes of said unit according to the condition of yield of said tractor connection, and means normally rendering inoperative said brake operating mechanism and serving to render the same operative when the speed of the trailer unit relative to the road exceeds a predetermined minimum amount which minimum amount is independent of the tractor speed, substantially as described.

2. The combination with an automobile tractor unit having the usual braking system and controls therefor, of a trailer unit in conjunction therewith, wheel brakes on the trailer unit, a yieldable tractor connection between said tractor unit and said trailer unit yieldable longitudinally of the combination, brake operating mechanism on the trailer unit effective to operate the brakes of said unit according to the condition of yield of said tractor connection, and a speed governor on the trailer unit in connection with the brake operating mechanism thereof effective to render the said brake operating mechanism ineffective when the speed of the trailer unit is less than a predetermined amount, substantially as described.

3. The combination with an automobile tractor unit having the usual braking system and controls therefor, of a trailer unit in conjunction therewith, wheel brakes on the trailer unit, a yieldable tractor connection between said tractor unit and said trailer unit yieldable longitudinally of the combination, trailer brake operating means, means to actuate said trailer brake operating means when the yieldable tractor connection is shortened due to over-riding of the trailer towards the tractor unit, together with means on the trailer unit to render ineffective said trailer brake actuating means, under predetermined conditions of trailer speed relative to the road and independent of tractor speed, substantially as described.

4. The combination with an automobile tractor unit having the usual braking system and controls therefor, of a trailer unit in conjunction therewith, wheel brakes on the trailer unit, brake operating means for said trailer brakes, and means local to the trailer unit in conjunction with the brake operating means of said unit effective to control the functioning of said trailer brake operating means according to tendency of the trailer unit to over-ride the tractor unit, together with means to render said trailer brake operating means ineffective when the speed of the trailer is less than a predetermined amount irrespective of such tendency to over-ride and irrespective of the tractor speed, substantially as described.

5. The combination with an automobile tractor unit having the usual braking system and controls therefor, of a trailer unit in conjunction therewith, wheel brakes on the trailer unit, brake operating means for said trailer brakes, and means wholly local to the trailer unit in conjunction with the brake operating means of said unit effective to control the functioning of said trailer brake operating means according to tendency of the trailer unit to over-ride the tractor unit, and including means effective to lock out the trailer brake operating means when the speed of the combination is less than a certain predetermined amount irrespective of such tendency to override and irrespective of tractor speed, and thereby render the trailer brakes ineffective at such times, substantially as described.

6. The combination with an automobile tractor unit having the usual braking system and controls therefor, of a trailer unit in conjunction therewith, wheel brakes on the trailer unit, brake operating means for said trailer brakes, means to ensure operation of the trailer brakes when the tractor unit is being braked, together with means in conjunction with the trailer brake operating means effective to vary the braking action on the wheels of the trailer according to lateral movements of the trailer, substantially as described.

7. The combination with an automobile tractor unit having the usual braking system and controls therefor, of a trailer unit in conjunction therewith, wheel brakes on the trailer unit, brake operating means for said trailer brakes, means to ensure operation of the trailer brakes when the tractor unit is being braked, a pendulum device mounted on the trailer for lateral movement with respect to the direction of trailer travel, and operating connections between said pendulum device and the trailer brake operating means effective to reduce braking action on the side of the trailer from which the trailer moves during side sway, substantially as described.

8. The combination with an automobile tractor unit having the usual braking system and controls therefor, of a trailer unit in conjunction therewith, wheel brakes on the trailer unit, brake operating means for said trailer brakes, means to ensure operation of the trailer brakes when the tractor unit is being braked, means to cause differential action of the braking action on the different trailer wheels, and means to control said differential action means by side sway of the trailer, effectively to reduce the braking action of the trailer wheel brake at the side of the trailer from which the sway movement is taking place, substantially as described.

9. The combination with an automobile tractor unit having the usual braking system and controls therefor, of a trailer unit in conjunction therewith, wheel brakes for the trailer unit, brake operating means for said trailer brakes, means to ensure operation of the trailer brakes when the tractor is being braked, and a sway compensating device on the trailer unit, including a pendulum mounted on the trailer unit and adapted to swing laterally thereof with lateral sway of the trailer unit, and connections between said pendulum and the trailer brake operating means effective to reduce braking action on the side of the trailer from which the trailer is swaying, substantially as described.

10. The combination with an automobile tractor unit having the usual braking system and controls therefor, of a trailer unit in conjunction therewith, wheel brakes for the trailer unit, brake operating means for the trailer brakes, means to ensure operation of the trailer brakes under predetermined conditions, a pivotal traction connection between the tractor unit and the trailer unit, permitting lateral sway of the trailer unit with respect to the tractor unit, together with means on the trailer unit to ensure differential braking action of the trailer brakes at the two sides of the trailer with reduction of braking action at the side from which the trailer is swaying, substantially as described.

11. The combination with an automobile tractor unit having a braking system and the usual controls therefor, of a trailer unit in conjunction therewith, wheel brakes for the trailer unit, brake operating means for the trailer brakes, means to ensure operation of the trailer brakes under predetermined conditions, a pivotal traction connection between the tractor unit and the trailer unit, permitting lateral sway of the trailer unit with respect to the tractor unit, together with means on the trailer unit to ensure differential braking action of the trailer brakes at the two sides of the trailer giving a maximum braking action at the side towards which the trailer is swaying, substantially as described.

12. The combination with an automobile tractor unit having a braking system and the usual controls therefor, of a trailer unit in conjunction therewith, wheel brakes for the trailer unit, brake operating means for the trailer brakes, and means to ensure differential braking action at the two sides of the trailer operative according to side sway of the trailer to ensure a maximum braking action at the side of the trailer towards which the trailer is swaying, substantially as described.

13. The combination with an automobile tractor unit having the usual braking system and controls therefor, of a trailer unit in conjunction therewith, a yieldable traction connection between the tractor unit and the trailer unit yieldable in the direction of travel of the units, hydraulic braking means for the wheels of the trailer unit, including a master hydraulic cylinder and hydraulic wheel brake cylinders, a master hydraulic line connecting the master hydraulic cylinder with the hydraulic brake cylinders, and a damping valve in said line permitting free flow of liquid between the master cylinder and the brake cylinder in one direction and restricted flow thereof in the other direction, substantially as described.

14. The combination with an automobile tractor unit having the usual braking system and controls therefor, of a trailer unit in conjunction therewith, a yieldable traction connection between the tractor unit and the trailer unit yieldable in the direction of travel of the units, hydraulic braking means for the wheels of the trailer unit, including a master hydraulic cylinder and hydraulic wheel brake cylinders, a master hydraulic line connecting the master hydraulic cylinder with the hydraulic brake cylinders, together with means for damping hydraulic flow through said line in one direction of hydraulic travel with a greater effect than in the other direction of hydraulic travel, substantially as described.

15. The combination with an automobile tractor unit having the usual braking system and controls therefor, of a trailer unit in conjunction therewith, a yieldable traction connection between the tractor unit and the trailer unit yieldable in the direction of travel of the units, braking means on the trailer unit, connections between the yieldable tractor connection and said braking means effective to ensure actuation of the trailer braking means under certain conditions of yield of the tractor connection, and means for damping the effectiveness of said last-named connections effectively to create a lag in the braking action of the trailer unit with respect to the variations of the yieldable tractor connection, substantially as described.

THOMAS A. BANNING, Jr.